March 12, 1957     H. T. SEALE     2,784,978
LEVELING VALVE ARRANGEMENT FOR PNEUMATIC SPRING SUSPENSION
Filed July 14, 1955     2 Sheets-Sheet 1
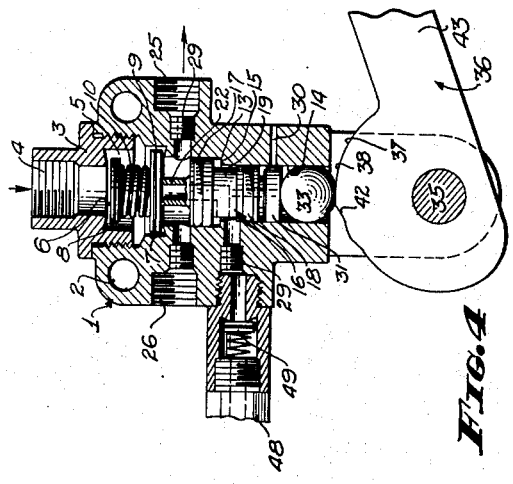
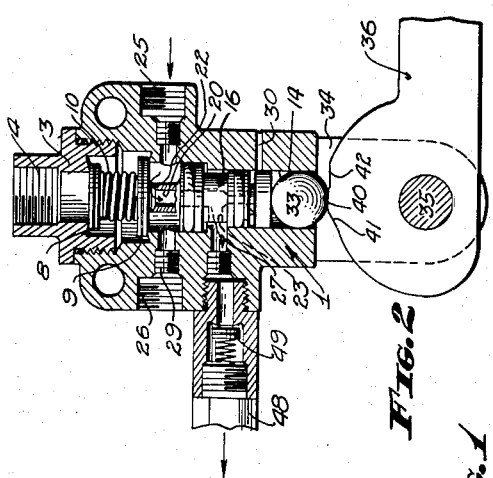
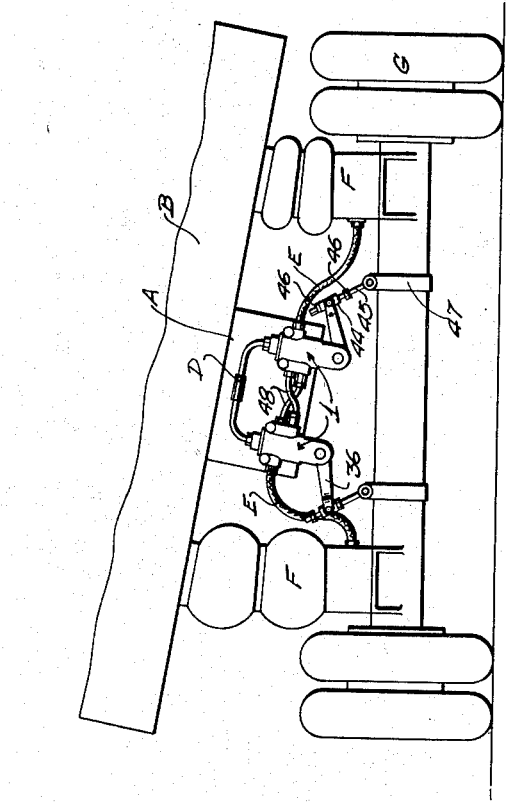
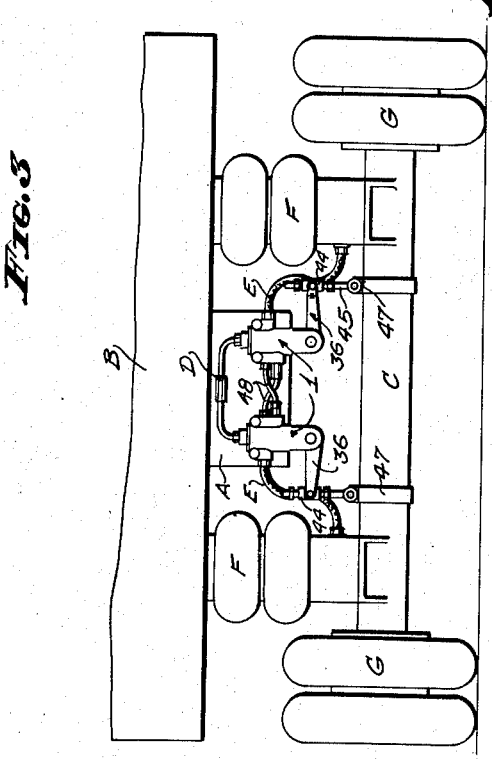
INVENTOR.
HOMER T. SEALE
BY Lyon & Lyon
ATTORNEYS March 12, 1957
H. T. SEALE
2,784,978
LEVELING VALVE ARRANGEMENT FOR PNEUMATIC SPRING SUSPENSION
Filed July 14, 1955
2 Sheets-Sheet 2
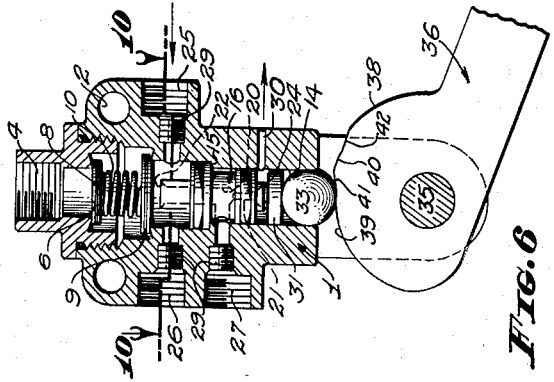
INVENTOR.
HOMER T. SEALE
BY
ATTORNEYS

United States Patent Office 2,784,978
Patented Mar. 12, 1957

2,784,978

LEVELING VALVE ARRANGEMENT FOR PNEUMATIC SPRING SUSPENSION

Homer T. Seale, Los Angeles, Calif.

Application July 14, 1955, Serial No. 521,988

10 Claims. (Cl. 280—6)

This invention relates to leveling valves for vehicles, that is, to valves for use in conjunction with inflatable pneumatic suspension devices for vehicles wherein air pressure is increased or decreased in a pair of such suspension devices to maintain the vehicle substantially level irrespective of load distribution or unbalanced forces resulting from turning maneuvers of the vehicle.

Included in the objects of this invention are:

First, to provide a leveling valve for the control of pneumatic springs interposed between a vehicle body and undercarriage, the valves being arranged in pairs and mechanically connected between the vehicle body and undercarriage and pneumatically connected to their respective pneumatic springs, as well as being cross-connected to each other, whereby on tilting of the vehicle body the fluid pressures in the pneumatic springs are altered, by action of the leveling valves, to restore the vehicle body to a substantially level condition.

Second, to provide a leveling valve of this character arranged in pairs and cross-connected in such a manner that excess pressure fluid from one pneumatic spring is first offered to the other valve and its pneumatic spring and only exhausted if not acceptable by the other pneumatic spring. Or, conversely, a pneumatic spring requiring additional pressure fluid is normally supplied from the other pneumatic spring if the other pneumatic spring has a higher pressure, which higher pressure is in excess of its need before demand is made on the source of pressure fluid; thus providing a leveling valve so arranged as to effect substantial saving in the amount of pressure fluid required to maintain the vehicle in a level position, and is so retained irrespective of subsequent load distribution.

Third, to provide an apparatus of this character which, although arranged to effect transfer of pressure fluid from one pneumatic spring to the other, does not cause depletion of pressure to the other pneumatic spring from a pneumatic spring which itself is in need of pressure fluid.

Fourth, to provide an apparatus of this character utilizing a pair of cross-connected leveling valves, where, in the event of failure of either leveling valve to exhaust excess pressure from its pneumatic spring unit, the excess pressure fluid is either offered to the other pneumatic spring or caused to exhaust from the other leveling valve; and by reason of the cross connection between the leveling valves, the possibility of a build-up of excessive pressure beyond the safe pressure of the pneumatic springs is minimized.

Fifth, to provide an apparatus of this class whereby the vehicle may be preadjusted to a level position, irrespective of the load distribution therein, and wherein the height of the vehicle body relative to the undercarriage may also be preadjusted.

Sixth, to provide a leveling valve which is particularly economical of manufacture and which is readily serviced.

Seventh, to provide a valve of this class which is particularly compact and easily installed, and is also particularly easy to install and adjust on various types and makes of vehicles for use with different types of pneumatic suspension devices.

With the above and other objects in view, as may appear hereinafter, reference is directed to the accompanying drawings in which:

Figure 1 is a diagrammatical rear view of a vehicle showing a pair of the leveling valves installed thereon, the body of the vehicle being shown in its level or normal position;

Fig. 2 is an enlarged, longitudinal sectional view of the right-hand leveling valve, as viewed in Fig. 1, the section being taken in a plane parallel with Fig. 1 with the control lever shown fragmentarily, the valve being shown in its intermediate position corresponding with the level condition of the vehicle body;

Fig. 3 is a diagrammatical rear view of a vehicle with the vehicle body tilted to the right;

Fig. 4 is a longitudinal sectional view of the right-hand leveling valve corresponding to Fig. 2 but with the valve in the position in which pressure fluid is supplied to the corresponding pneumatic spring;

Fig. 5 is a diagrammatical rear view of the vehicle tilted to the left;

Fig. 6 is a longitudinal sectional view of the right-hand leveling valve, corresponding to Figs. 2 and 4 but showing the parts of the leveling valve in the position assumed when pressure fluid is being exhausted from the corresponding pneumatic spring;

Fig. 7 is an enlarged sectional view of one of the valve discs;

Fig. 8 is an enlarged, longitudinal sectional view of the valve armature;

Fig. 9 is a sectional view of another valve disc;

Fig. 10 is a transverse sectional view through 10—10 of Fig. 6;

Fig. 11 is a side view of a modified form of cam lever.

The leveling valve is intended to be used in pairs. Each leveling valve includes a valve body 1 having suitable mounting means 2 for attachment to a bracket A or other support, depending from a vehicle body B.

The valve body 1 is provided with a stepped longitudinal bore, the upper or larger end of which is closed by a cap 3 provided with an inlet port 4. The cap and enlarged end of the valve body bore form an inlet chamber 5 having confronting valve seats 6 and 7 formed by shoulders in the cap 3 and valve body 1, respectively. The valve seats are engaged by valve discs 8 and 9 and are urged in sealing contact by means of a spring 10 interposed between the valve discs.

Each valve disc 8 or 9 includes a metal reinforcing disc 11, to one or both sides of which is bonded a yieldable valve facing 12, as shown best in Fig. 7.

Below the inlet chamber 5 the bore of the valve body 1 forms a major cylinder 13 adjacent the inlet chamber 5 and a minor cylinder 14 remote from the inlet chamber. A shoulder 15 is formed between the major and minor cylinders.

Reciprocably mounted within the major cylinder 13 and minor cylinder 14 is a valve armature 16, which is shown best in Fig. 8. The valve armature includes a major piston 17 and a minor piston 18 joined by a connecting section 19. A bore 20 extends axially through the valve armature 16 and is provided with a constriction 21 near its lower end.

Above the major piston 17 the valve armature 16 projects upwardly to form an inlet stem 22 terminating in a valve seat engageable with the valve disc 8. A side port 23 is formed in the connecting section 19 and communicates with the bore 20. The lower end of the valve armature 16 projects a short distance below the minor piston 18 and forms an exhaust stem 24 terminating in a valve seat. Suitable seal means, such as O-rings, are provided in the major and minor pistons.

The major cylinder 13 is intersected at a level above the major piston 17 by a laterally directed delivery port 25 and a laterally directed accepting port 26. The region of the minor cylinder 14, opposite the connecting section 19, is intersected by a laterally directed offering port 27 isolated from the remainder of the valve by the pistons 17 and 18. The various ports may be provided with choke elements 29 for the purpose of regulating the rate of flow of pressure fluid therethrough. Below the minor piston 18 the minor cylinder 14 is intersected by a laterally directed exhaust port 30.

Fitted within the minor cylinder 14, below the valve armature 16, is a valve disc 31, shown best in Fig. 9. The valve disc is in the form of a short cylindrical portion having a yieldable valve facing 32 on its upper surface. The valve facing is engageable with the extremity of the exhaust stem 24. Also mounted within the minor cylinder 14, below the valve disc 31, is a ball or other suitable cam follower 33.

Depending from and forming part of the valve body 1 is a yoke 34, which receives a transverse journal pin 35 on which is mounted a cam lever 36. The cam lever includes a cam 37 having a major diametered face 38, a minor diametered face 39, and an intermediate diametered face 40 connected by sloping sections 41 and 42. The cam 37 is so arranged that parts of the leveling valve may assume three different characteristic positions represented by Figs. 2, 4, and 6, as will be brought out in more detail hereinafter.

The cam lever 36 includes a lever arm 43, the extended end of which may pivotally support a sleeve 44 adapted to fit a rod 45 and be positioned thereon by adjustment nuts 46. The rod 45 is pivotally connected to a bracket 47 secured to the vehicle axle C, or to any suitable part of the undercarriage of the vehicle which is rigid with respect to the vehicle axle C.

The inlet ports 4 of the caps 3 of the pair of leveling valves are connected to a common pressure fluid supply line D. The delivery port 25 of each leveling valve is connected through a flexible hose E to a corresponding pneumatic spring unit F, located between the vehicle B and the axle C inward of the vehicle wheels G.

The accepting port 26 of each leveling valve is connected by a cross-line 48 to the offering port 27 of the other leveling valve. Each cross-line 48 is provided with a check valve 49 so arranged that flow may occur from either offering port 27 to the corresponding accepting port 26, but back flow is prevented.

Operation of the vehicle leveling valve is as follows:

Reference is first directed to Figs. 1 and 2. When the vehicle body B is in its level position and at a suitable height, neither pneumatic spring unit F requires additional pressure fluid. Thus, as shown in Fig. 2, both valve discs 8 and 9 are seated so that pressure fluid cannot be supplied through the inlet chamber 5 to the delivery port 25. However, the valve armature 16 is in its intermediate position with the inlet stem 22 clearing the valve disc 9 so that flow can occur from the delivery port 25 through the bore 20 and side port 23 of the valve armature 16 to the offering port 27. Also the delivery port 25 is directly connected with the accepting port 26. Under these conditions pressure fluid may transfer from the pneumatic spring having the higher pressure to the pneumatic spring having the lower pressure.

Reference is now directed to Fig. 4. Assuming that the vehicle body B tilts to the right, as shown in Fig. 3, the right-hand leveling valve occupies the position shown in Fig. 4. In this position the valve armature 16 is raised, causing the inlet stem 22 to lift the valve disc 9 and permit flow of pressure fluid from the inlet port 4 through the inlet chamber 5 to the delivery port 25, thus increasing the pressure within the corresponding pneumatic spring to raise the lower side of the vehicle body. When the valve parts are in this position the bore 20 through the valve armature 16 is sealed so that no pressure fluid is delivered to the offering port 27. Although the accepting port 26 is open to the delivery port 25, a check valve 49 in the corresponding cross-line 48 is closed so that pressure fluid is not delivered to the other leveling valve.

Reference is now directed to Figs. 5 and 6.

When the right-hand side of the vehicle is raised, as in Fig. 5, the parts of the right-hand leveling valve occupy the position shown in Fig. 6. In this position the valve armature 16 occupies its lowest position, and pressure fluid from the corresponding pneumatic spring is exhausted through the delivery port 25 and bore 20 of the valve armature 16 and exhaust port 30, it being noted that downward movement of the valve armature 16 is limited by the shoulder 15. Under this condition pressure fluid could also be delivered to the other leveling valve, but only if the pressure in the other pneumatic spring was lower.

Reference is directed to Fig. 11. In addition to or in substitution of, the play afforded between the adjustment nuts 46, the arm 43 of the cam lever may comprise two sections 43a and 43b connected by a pin 43c. Abutting shoulders 43d are provided which permit limited free movement of the extended section 43b. This arrangement tends to minimize the transfer of superficial oscillations from the extended section of the lever arm to the cam, so that the leveling valve is not continuously oscillated by minor relative movement of the vehicle body and undercarriage or by minor vibrations of the wheels and axle.

By adjusting the position of the lever arm 43 of the lever arm section 43b on the corresponding rod 45, the relative positions of the two leveling valves for any position of the vehicle body B relative to the undercarriage can be obtained. Thus the normal height of the vehicle body above the undercarriage as well as the normal angular relation of the vehicle body relative to the axle can be adjusted.

By proper selection of the choke elements or orifice valves 29 the rates of flow may be preselected. Also by change in the contour of the cam 37 the relative action of the two leveling valves may be altered. It will be noted that by reason of the differential areas provided by the major and minor pistons, irrespective of the position of the valve armature, there is an unbalanced force urging the valve armature downwardly in opposition to the cam follower.

It will be observed that only in the extreme angular positions of the vehicle body relative to the undercarriage that pressure fluid is demanded or exhausted, for all intermediate positions the pressure fluid is interchanged between the pneumatic springs and is thus conserved. This greatly reduces the demand on the compressor which is called upon to maintain the pressure fluid supply.

It should be observed that the leveling valves function irrespective of what force causes the change of height or the tilting of the vehicle body from its normal position relative to the axle. That is, the vehicle body is urged towards its normal position, shown in Fig. 1, whether the tendency to tilt is due to unbalanced distribution of the vehicle load or to side forces, such as centrifugal force, as the vehicle is making a curve.

It follows that if in order to maintain the vehicle body level as shown in Fig. 1, when the load is not uniformly distributed, the pneumatic spring bearing the greater proportion of the load will have a greater pressure therein. The pneumatic spring bearing the greater load tends to exhaust through the valve of the other pneumatic spring, so that the exhaust from the pneumatic spring under the greater load is available for use by the spring under the lesser load before being exhausted.

It will be observed that by reason of the cross connection between the leveling valves, each pneumatic spring has, in effect, two exhaust paths through its own valve and through the valve of the opposite pneumatic spring. Thus, the possibility of the build-up of excessive pressure, should either exhaust port clog, is prevented.

Also, while the leveling valves are shown as arranged in independent housings or valve bodies, it should be understood that the housings or valve bodies may be integrally joined.

It will be observed that the internal parts of the leveling valve may be installed and removed from one end.

Having fully described my invention, it is to be understood that I do not wish to be limited to the details herein set forth, but my invention is of the full scope of the appended claims.

I claim:

1. The combination with a vehicle having a pair of pneumatic expansible and contractible spring units interposed between the vehicle body and its undercarriage and connected with a pressure fluid supply, of a leveling apparatus, comprising: means responsivle to a predetermined contraction of each pneumatic spring unit to connect said unit with said pressure fluid supply; means responsive to a predetermined expansion of each pneumatic spring unit to connect said unit with an exhaust; and means operable intermediate the pressure fluid receiving and exhausting positions of said pneumatic spring units, to transfer pressure fluid from the pneumatic spring unit having the higher pressure to the pneumatic spring unit having the lower pressure.

2. The combination with a vehicle having a pair of pneumatic expansible and contractible spring units interposed between the vehicle body and its undercarriage and connected with a pressure fluid supply, of a leveling apparatus, comprising: a valve mechanism for each pneumatic spring unit and having a part fixed relative to said vehicle body and a part connected with said undercarriage for relative movement corresponding to relative movement of said vehicle body and said undercarriage; each of said valve mechanisms having a first extreme position determined by said parts wherein a corresponding pneumatic spring unit is connected with said source of pressure fluid, a second extreme position determined by said parts wherein said pneumatic spring unit is connected to an exhaust port, and an intermediate position determined by said parts wherein pressure fluid may flow from the pneumatic spring unit having the higher pressure to the pneumatic spring unit having the lower pressure.

3. The combination with a vehicle having a pair of pneumatic expansible and contractible spring units interposed between the vehicle body and its undercarriage and connected with a pressure fluid supply, of a leveling apparatus, comprising: a pair of valve structures responsive to relative movement of said vehicle body and undercarriage due to expansion and contraction of said vehicle spring units; each of said valve structures having a first extreme position, an intermediate position, and a second extreme position corresponding respectively to a contracted, neutral, and an expanded position of a corresponding pneumatic spring unit; means defining, when either valve structure is in its first extreme position, a flow passage from said pressure fluid supply through said valve structures to the corresponding pneumatic spring unit; means defining, when either valve structure is in its second extreme position, a flow passage from the corresponding pneumatic spring unit through said valve structure to exhaust; and means defining, when either valve structure is in its intermediate position, a flow passage for pressure fluid from the corresponding pneumatic spring unit to the other pneumatic spring unit, there being a check valve in said last mentioned flow passage to prevent return flow of pressure fluid.

4. The combination with a vehicle having a pair of pneumatic expansible and contractible spring units interposed between the vehicle body and its undercarriage and connected with a pressure fluid supply, of a leveling apparatus, comprising: a valve body for each pneumatic spring unit fixed relative to said vehicle body and connected with said pressure fluid supply; a valve armature movable in each valve body; an operating means operatively connecting each valve armature with the undercarriage of said vehicle; means defining a delivery passage communicating between each valve body and its corresponding pneumatic spring unit; means defining an offering passage communicating from each valve body to the pneumatic spring unit of the other valve body; a check valve in each offering passage to prevent back flow therein; each of said valve bodies and their armatures having a first extreme position for effecting communication between a corresponding pneumatic spring unit and said pressure fluid source through said delivery passage, a second extreme position for exhausting pressure fluid from said pneumatic spring unit, and an intermediate position for effecting delivery of pressure fluid from the corresponding pneumatic spring unit through said offering passage to the other pneumatic spring unit when the pressure in said other pneumatic spring unit is lower.

5. The combination with a vehicle having a pair of pneumatic expansible and contractible spring units interposed between the vehicle body and its undercarriage and connected with a pressure fluid supply, of a leveling apparatus, comprising: a valve body for each pneumatic spring unit fixed relative to said vehicle body and connected with said pressure fluid supply; a valve armature movable in each valve body; a cam lever for each valve body including a cam element for controlling movement of said valve armature and determining a first extreme position, a second extreme position, and an intermediate position thereof, and a lever arm connected to the undercarriage of said vehicle; a delivery passage communicating between each valve body and its corresponding pneumatic spring unit; an offering passage communicating from each valve body to the pneumatic spring unit of the other valve body; a check valve in each offering passage to prevent back flow therein; each of said valve bodies and their armatures, when in said first extreme position, adapted to effect communication between a corresponding pneumatic spring unit and said pressure fluid source through said delivery passage, a second extreme position for exhausting pressure fluid from said pneumatic spring unit, and an intermediate position for effecting delivery of pressure fluid from the corresponding pneumatic spring unit through said offering passage to the other pneumatic spring unit when the pressure in said other pneumatic spring unit is lower.

6. The combination with a vehicle having a pair of pneumatic expansible and contractible spring units interposed between the vehicle body and its undercarriage and connected with a pressure fluid supply, of a leveling apparatus, comprising: a pair of valve bodies fixed relative to said vehicle body, each of said valve bodies having an intake port connected with said pressure fluid supply, a delivery port connected with a corresponding pneumatic spring unit, an offering port, an accepting port, and an exhaust port; means defining offering passages connecting the offering port of each valve body with the accepting port of the other valve body; a check valve element to prevent back flow through said intake port; a valve means normally closing flow from said intake port to said delivery port; an armature movable in said valve body engageable to open said valve means, said armature forming with said valve body means defining an offering passageway between said delivery port and said offering port when said armature is disengaged from said valve means, means including said passageway forming an exhaust passageway communicating through said armature to said exhaust port; an exhaust closure valve element interposed between said exhaust passageway and said exhaust port; means connected to said undercarriage and operable through said exhaust closure valve element to move said armature; said valve means, when opened by said armature, effecting communication between said intake port and said delivery port to supply pressure fluid to the corresponding pneumatic spring unit; said armature, when disengaged from said valve disc, effecting communication through said offering passageway between said delivery port and said offering port to offer pressure fluid through the accepting port of the other valve body to the other pneumatic spring unit; said exhaust closure valve element being movable clear of said armature to effect communication between said delivery port and said exhaust port to discharge pressure fluid from said corresponding pneumatic spring unit.

7. A leveling valve for penumatic spring units interposed between a vehicle body and its undercarriage, comprising: a valve body defining an inlet port, a delivery port, an offering port, and an exhaust port; a means movable in said valve body having valve seats at its extremities and defining a passageway therebetween affording communication between said delivery port and exhaust port, and a lateral port affording communication between said delivery port and offering port; a valve element and seat therefor between said inlet port and delivery port and engageable by a seat of said movable means to effect communication between said inlet and delivery port and close the passageway through said movable means; a valve device engageable with the other seat of said movable means to close communication between said passageway and said exhaust port; and means for moving said movable means between a first extreme position effecting communication between said inlet port and delivery port, a second extreme position effecting communication between said delivery port and exhaust port, and an intermediate position effecting communication between said delivery and offering ports.

8. The combination with a vehicle having a pair of pneumatic expansible and contractible spring units interposed between the vehicle body and its undercarriage and connected with a pressure fluid supply, of a leveling apparatus, comprising: a valve mechanism for each pneumatic spring unit, each valve mechanism adapted to occupy a first position for effecting supply of pressure fluid to the corresponding pneumatic spring and a second position for effecting exhaust of pressure fluid therefrom; means operatively connected between each valve mechanism and the vehicle undercarriage to effect movement thereof between said first and second positions, on relative movement of the vehicle body and its undercarriage; a lost motion device interposed in said means to absorb superficial movement of said undercarriage without transmission of such movement to said valve mechanism; and means effecting a cross connection between said valve mechanisms whereby, intermediate the extreme positions of said valve mechanisms, pressure fluid is offered by the pneumatic spring unit having the higher pressure to the pneumatic spring unit having the lower pressure.

9. The combination with a vehicle having a pair of pneumatic expansible and contractible spring units interposed between the vehicle body and its undercarriage and connected with a pressure fluid supply, of a leveling apparatus, comprising: a dual valve structure including similar movable elements, each adapted to occupy a first extreme position for effecting communication between said pressure fluid supply and a corresponding pneumatic spring, and a second position for effecting exhaust of pressure fluid from said corresponding pneumatic spring; means operatively connected between each of said movable elements and said vehicle undercarriage to cause movement thereof between said first and second positions on relative movement of the vehicle body and its undercarriage; and means defining cross connections between said movable elements operable, when said movable elements are in positions intermediate said first and second positions, to effect flow of pressure fluid from the pneumatic spring having greater pressure to the pneumatic spring having lesser pressure.

10. The combination with a vehicle having a pair of pneumatic expansible and contractible spring units interposed between the vehicle body and its undercarriage and connected with a pressure fluid supply, of a leveling apparatus, comprising: a pair of valve structures responsive to relative movement of said vehicle body and undercarriage due to expansion and contraction of said vehicle spring units; each of said valve structures having a first extreme position, an intermediate position, and a second extreme position corresponding respectively to a contracted, neutral, and an expanded position of a corresponding pneumatic spring unit; means defining, when either valve structure is in its first extreme position, a flow passage from said pressure fluid supply through said valve structures to the corresponding pneumatic spring unit; means defining, when either valve structure is in its second extreme position, a flow passage from the corresponding pneumatic spring unit through said valve structure to exhaust; means defining, when either valve structure is in its intermediate position, a flow passage for pressure fluid from the corresponding pneumatic spring unit to the other pneumatic spring unit, there being a check valve in said last mentioned flow passage to prevent return flow of pressure fluid; said last mentioned means also defining, when one valve structure is in its intermediate position and the other valve structure is in its exhaust position, a second exhaust path for the pneumatic spring corresponding to said one valve structure.

References Cited in the file of this patent
UNITED STATES PATENTS
1,641,640    Myers _____ Sept. 6, 1927